United States Patent
Kuo et al.

(10) Patent No.: US 7,031,343 B1
(45) Date of Patent: Apr. 18, 2006

(54) POINT-TO-MULTIPOINT PASSIVE OPTICAL NETWORK THAT UTILIZES VARIABLE-LENGTH PACKETS

(75) Inventors: Jerchen Kuo, Davis, CA (US); Dumitru Gruia, San Ramon, CA (US); Glen Kramer, Davis, CA (US); Gerry Pesavento, Davis, CA (US)

(73) Assignee: Alloptic, Inc., Livermore, CA (US)

( * ) Notice: Subject to any disclaimer, the term of this patent is extended or adjusted under 35 U.S.C. 154(b) by 120 days.

(21) Appl. No.: 09/715,275

(22) Filed: Nov. 17, 2000

(51) Int. Cl.
*H04J 3/24* (2006.01)
(52) U.S. Cl. .................................. 370/473; 370/474
(58) Field of Classification Search ............. 370/235, 370/470–473, 395.4; 359/135–138, 168
See application file for complete search history.

(56) References Cited

U.S. PATENT DOCUMENTS

| | | | | |
|---|---|---|---|---|
| 5,181,106 A | * | 1/1993 | Sutherland | 725/119 |
| 5,189,671 A | * | 2/1993 | Cheng | 370/471 |
| 5,754,941 A | | 5/1998 | Sharpe et al. | |
| 5,978,374 A | | 11/1999 | Ghaibeh et al. | |
| 6,023,467 A | | 2/2000 | Abdelhamid et al. | |
| 6,198,558 B1 | * | 3/2001 | Graves et al. | 359/137 |
| 6,215,789 B1 | * | 4/2001 | Keenan et al. | 370/399 |
| 6,347,096 B1 | * | 2/2002 | Profumo et al. | 370/476 |

FOREIGN PATENT DOCUMENTS

EP       1130841 A1 *  9/2001

OTHER PUBLICATIONS

K.V. Shrikhande, FIBER-to-the-home/desktop using Ethernet, WM54-1/353, Optical Fiber Communications Conference Feb. 24, 1999.

* cited by examiner

*Primary Examiner*—Chi Pham
*Assistant Examiner*—Thai Hoang
(74) *Attorney, Agent, or Firm*—Hankin Patent Law; Marc E. Hankin

(57) ABSTRACT

A point-to-multipoint passive optical network transmits downstream data from an optical line terminal (OLT) to multiple optical network units (ONUs) in variable-length packets and upstream data from the ONUs to the OLT in variable-length packets utilizing time division multiplexing to avoid transmission collisions. In an embodiment, the variable-length downstream packets and the variable-length upstream packets are formatted according to IEEE 802.3. In an embodiment, the length of the variable-length downstream and upstream packets is related to the length of Internet protocol (IP) datagrams carried within the packets.

47 Claims, 7 Drawing Sheets

Downstream Traffic

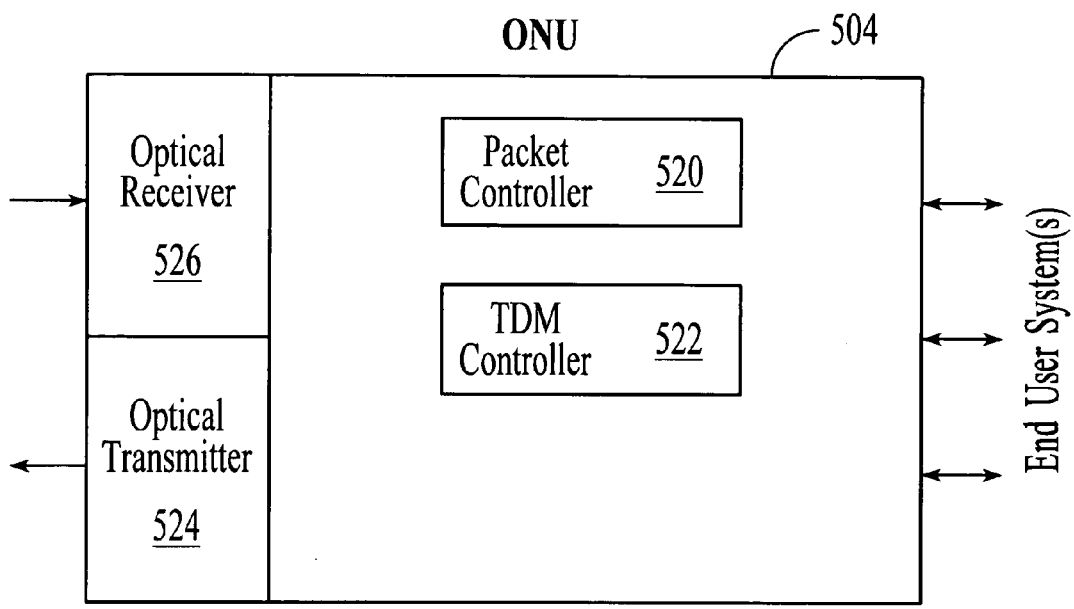
FIG. 5
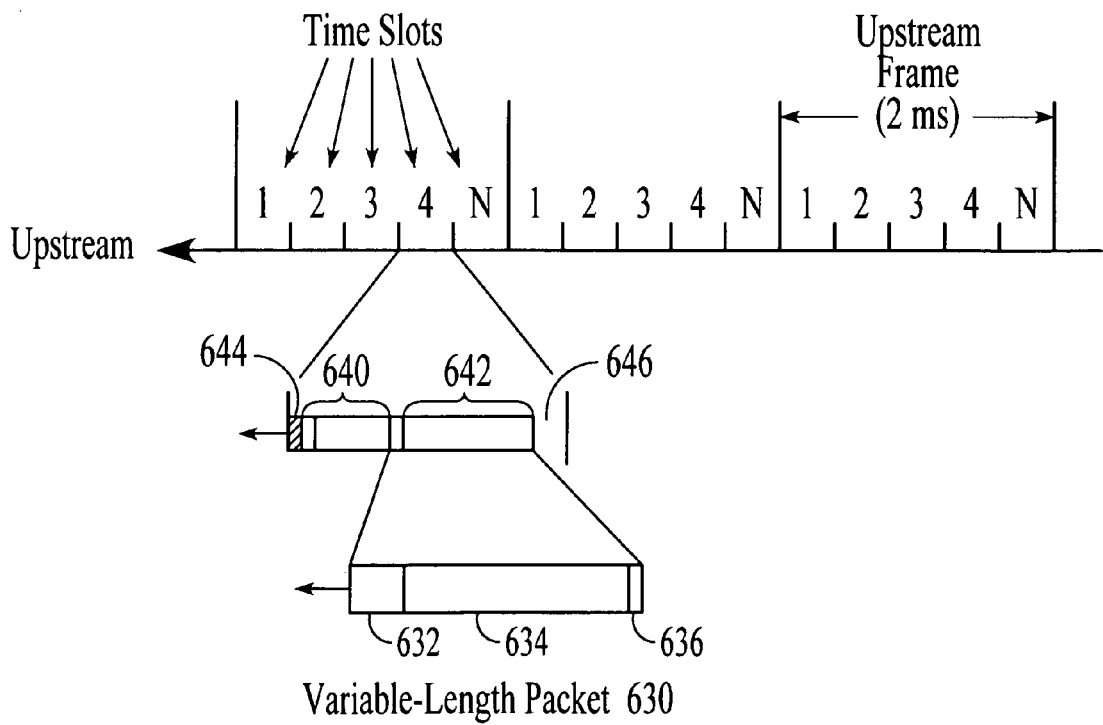
FIG. 6 Upstream Traffic

POINT-TO-MULTIPOINT PASSIVE OPTICAL NETWORK THAT UTILIZES VARIABLE-LENGTH PACKETS

FIELD OF THE INVENTION

The invention relates generally to broadband optical communications networks, and more particularly to point-to-multipoint passive optical networks.

BACKGROUND OF THE INVENTION

The explosion of the Internet and the desire to provide multiple communications and entertainment services to end users have created a need for a broadband network architecture that improves access to end users. One broadband network architecture that improves access to end users is a point-to-multipoint passive optical network (PON). A point-to-multipoint PON is an optical access network architecture that facilitates broadband communications between an optical line terminal (OLT) and multiple remote optical network units (ONUs) over a purely passive optical distribution network. A point-to-multipoint PON utilizes passive fiber optic splitters and couplers to passively distribute optical signals between the OLT and the remote ONUs.

FIGS. 1A and 1B represent the downstream and upstream flow of network traffic between an OLT 102 and three ONUs 104 in a point-to-multipoint PON. Although only three ONUs are depicted, more than three ONUs may be included in a point-to-multipoint PON. Referring to FIG. 1A, downstream traffic containing ONU-specific information blocks is transmitted from the OLT. The downstream traffic is optically split by a passive optical splitter 112 into three separate signals that each carries all of the ONU-specific information blocks. Each ONU reads the information blocks that are intended for the ONU and discards the information blocks that are intended for the other ONUs. For example, ONU-1 receives information blocks 1, 2, and 3, however it only delivers information block 1 to end user 1. Likewise, ONU-2 delivers information block 2 to end user 2 and ONU-3 delivers information block 3 to end user 3. Referring to FIG. 1B, upstream traffic is managed utilizing time division multiplexing, in which transmission time slots are dedicated to the ONUs. The time slots are synchronized so that upstream information blocks from the ONUs do not interfere with each other once the information blocks are coupled onto the common fiber 110, often referred to as the trunk. For example, ONU-1 transmits information block 1 in a first time slot, ONU-2 transmits information block 2 in a second non-overlapping time slot, and ONU-3 transmits information block 3 in a third non-overlapping time slot. As shown in FIG. 1B, all of the information blocks travel on the trunk in non-overlapping time slots.

Because point-to-multipoint PONs are intended to deliver integrated voice, data, and video services, existing point-to-multipoint PONs have been designed around the ATM data link protocol, which was designed with quality of service (QoS) features that enable integrated voice, data, and video delivery over a single communications channel. As is well known in the field of packet-switched communications, the ATM protocol transmits information in fixed-length 53 byte cells (48 bytes of payload and 5 bytes of overhead). In an ATM-based point-to-multipoint PON, fixed-length ATM cells are used to transmit information in both the downstream and upstream directions. For example, as disclosed in U.S. Pat. No. 5,978,374, each time slot in the upstream traffic flow is filled with a single fixed-length ATM cell and a fixed-length traffic control field.

Although the ATM protocol utilizes fixed-length 53-byte cells, ATM networks are often required to carry traffic that is formatted according to the widely used Internet protocol (IP). The Internet protocol calls for data to be segmented into variable-length datagrams of up to 65,535 bytes. In order for an ATM-based point-to-multipoint PON to carry IP traffic, the IP datagrams must be broken into 48 byte segments and a 5 byte header must be added. Breaking all incoming IP datagrams into 48 byte segments and adding a 5 byte header creates a large quantity of overhead that consumes valuable bandwidth in a point-to-multipoint PON. In addition to the increased bandwidth consumed by the ATM header, the process of converting IP datagrams into ATM cells is time consuming and the specialized hardware adds additional cost to the OLT and ONUs.

Another data link protocol that has been incorporated into a point-to-multipoint PON is the IEEE 802.3 protocol (commonly referred to as ethernet). Ethernet carries payload data (such as IP datagrams) in variable-length packets of up to 1,518 bytes. Although the ethernet protocol data units are described as "packets," the protocol data units are also commonly referred to as ethernet "frames." Using variable-length packets of up to 1,518 bytes in a point-to-multipoint PON can greatly reduce the overhead of IP traffic when compared to the overhead of an ATM-based point-to-multipoint PON. In addition to the advantage of reduced overhead, ethernet network components are relatively affordable.

When multiple stations in an ethernet network share a common physical transmission channel, the ethernet protocol utilizes a carrier sense multiple access/collision detection protocol (CSMA/CD) as a media access control mechanism to avoid collisions between transmitted traffic. CSMA/CD is an efficient media access control protocol that does not require multiple stations to be synchronized. Applying CSMA/CD in an ethernet network requires that the minimum length of a packet must be longer than the maximum round-trip propagation time of the network in order to avoid collisions that cannot be detected by all of the stations on the network. That is, the maximum distance of separation between users in a multi-station ethernet network is limited by the collision domain. For example, in an ethernet network operating at 1 Gb/s, the maximum separation between stations is limited by CSMA/CD to approximately 200 meters. For point-to-multipoint PONs to be commercially feasible, the OLT and ONUs need to be able to be separated by more than the maximum distance allowed by CSMA/CD. In addition to the collision domain limitation, ethernet networks that rely on CSMA/CD are non-deterministic. That is, QoS guarantees cannot be made for traffic between the OLT and the ONUs.

In view of the limitations of ATM-based point-to-multipoint PONs and ethernet-based point-to-multipoint PONs that utilize CSMA/CD, what is needed is a point-to-multipoint PON that utilizes variable-length packets and that increases the maximum allowable separation between the OLT and the ONUs.

SUMMARY OF THE INVENTION

A system and method for point-to-multipoint communications involves a PON in which downstream data is transmitted from an OLT to multiple ONUs in variable-length packets and in which upstream data is transmitted from the ONUs to the OLT in variable-length packets utilizing time division multiplexing to avoid transmission collisions. Utilizing variable-length packets instead of fixed-length ATM cells to transmit data, such as IP data, reduces the transmission overhead when compared to an ATM-based point-to-multipoint PON. In addition, utilizing time division multiplexing to avoid upstream transmission collisions removes the distance limitations of shared media networks that utilize CSMA/CD as a media access control protocol.

An embodiment of a point-to-multipoint optical communications system includes an OLT and a plurality of ONUs connected to the OLT by a passive optical network in which downstream data is transmitted from the OLT to the ONUs over the PON and upstream data is transmitted from the ONUs to the OLT over the PON. The OLT transmits downstream data over the passive optical network in variable-length downstream packets. The ONUs transmit upstream data over the passive optical network within ONU-specific time slots utilizing time division multiplexing, wherein the ONU-specific time slots are filled with multiple variable-length upstream packets.

In an embodiment the variable-length downstream packets are formatted according to IEEE 802.3 or "ethernet." In an embodiment, the variable-length downstream packets include IP datagrams, and in another embodiment, the lengths of the variable-length downstream packets are related to the lengths of the IP datagrams.

In another embodiment the variable-length upstream packets are formatted according to IEEE 802.3. In an embodiment, the variable-length upstream packets include IP datagrams, and in another embodiment, the lengths of the variable-length upstream packets are related to the lengths of the IP datagrams.

In an embodiment, the variable-length downstream packets and the variable-length upstream packets are formatted according to IEEE 802.3 and the downstream data and the upstream data include IP datagrams.

In an embodiment, the OLT includes a fragment buffer for storing packet fragments that have been transmitted upstream from the ONUs and the ONUs include fragment buffers for storing packet fragments that are to be transmitted upstream from the ONUs. In addition to fragment buffers, the ONUs may include fragment logic for splitting an upstream variable-length packet into first and second packet fragments and adding an end-of-packet-fragment code to the first packet fragment and adding a start-of-packet-fragment code to the second packet fragment. In addition to fragment logic for the ONUs, the OLT may include fragment logic for identifying the end-of-packet-fragment code of the first packet fragment, buffering the first packet fragment in the OLT fragment buffer, identifying the start-of-packet-fragment code of the second packet fragment, and reconstructing the upstream variable-length packet from the first and second packet fragments.

A method for exchanging information between an OLT and multiple ONUs in a point-to-multipoint PON includes transmitting downstream data from the OLT to the ONUs in variable-length downstream packets and transmitting upstream data from the ONUs to the OLT in ONU-specific time slots utilizing time division multiplexing to avoid transmission collisions, wherein the ONU-specific time slots are filled with variable-length upstream packets.

In an embodiment, the variable-length downstream and upstream packets are formatted in accordance with the IEEE 802.3 protocol. In an embodiment, the variable-length downstream and upstream packets include a header and a payload and the length of the variable-length packets is related to the length of an IP datagram that is included in the payload of the variable-length packets.

An embodiment of the method includes inserting downstream IP datagrams into the variable-length downstream packets and inserting upstream IP datagrams into the variable-length upstream packets. In an embodiment, the variable-length downstream and upstream packets are formatted in accordance with the IEEE 802.3 protocol.

In an embodiment, the step of transmitting downstream data includes transmitting downstream synchronization markers at constant time intervals.

In an embodiment, the ONU-specific time slots are filled with multiple variable-length packets.

An embodiment of the method includes splitting an upstream variable-length packet into a first packet fragment and a second packet fragment, adding an end-of-packet-fragment code to the end of the first packet fragment, and adding a start-of-packet-fragment code to the start of the second packet fragment. An embodiment further includes transmitting the first packet fragment upstream in a first ONU-specific time slot, buffering the second packet fragment for transmission in a second ONU-specific time slot that is different from the first ONU-specific time slot, buffering the first packet fragment after the first packet fragment is received at the OLT, and reconstructing the upstream variable-length packet at the OLT from the first packet fragment and the second packet fragment.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 depicts a functional block diagram of an ONU for transmitting variable-length packets upstream with time division multiplexing, in accordance with an embodiment of the invention.

FIG. 6 depicts an example of upstream traffic including variable-length packets that are time division multiplexed in order to avoid collisions, in accordance with an embodiment of the invention.

DETAILED DESCRIPTION OF THE INVENTION

A system and method for point-to-multipoint communications involves a PON in which downstream data is transmitted from an OLT to multiple ONUs in variable-length packets and in which upstream data is transmitted from the ONUs to the OLT in variable-length packets utilizing time division multiplexing to avoid transmission collisions. In an embodiment, the downstream and upstream variable-length packets are formatted according to the IEEE 802.3 standard and the payload of the variable-length packets includes an IP datagram. In an embodiment, the length of each variable-length packet is related to the length of the IP datagram that is included in the payload of each variable-length packet. Utilizing variable-length packets instead of fixed-length ATM cells to transmit IP datagrams reduces the transmission overhead when compared to an ATM-based point-to-multipoint PON. In addition, utilizing time division multiplexing to avoid upstream transmission collisions removes the distance limitations of shared media networks that utilize CSMA/CD as a media access control protocol.

Figure 1A:
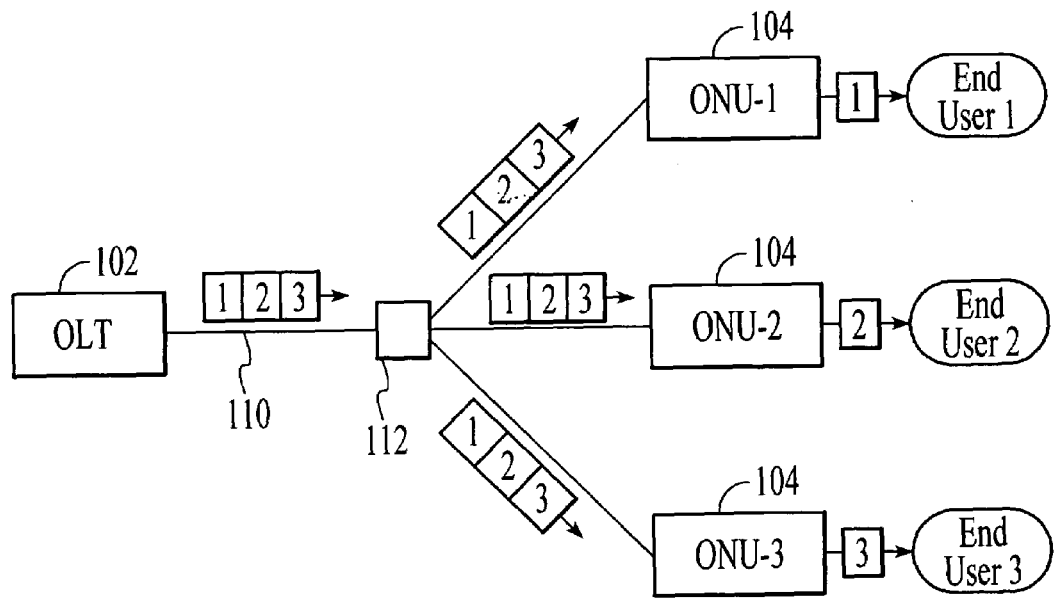
FIG. 1A depicts the downstream flow of traffic from an OLT to multiple ONUs in a point-to-multipoint PON.
Figure 1B:
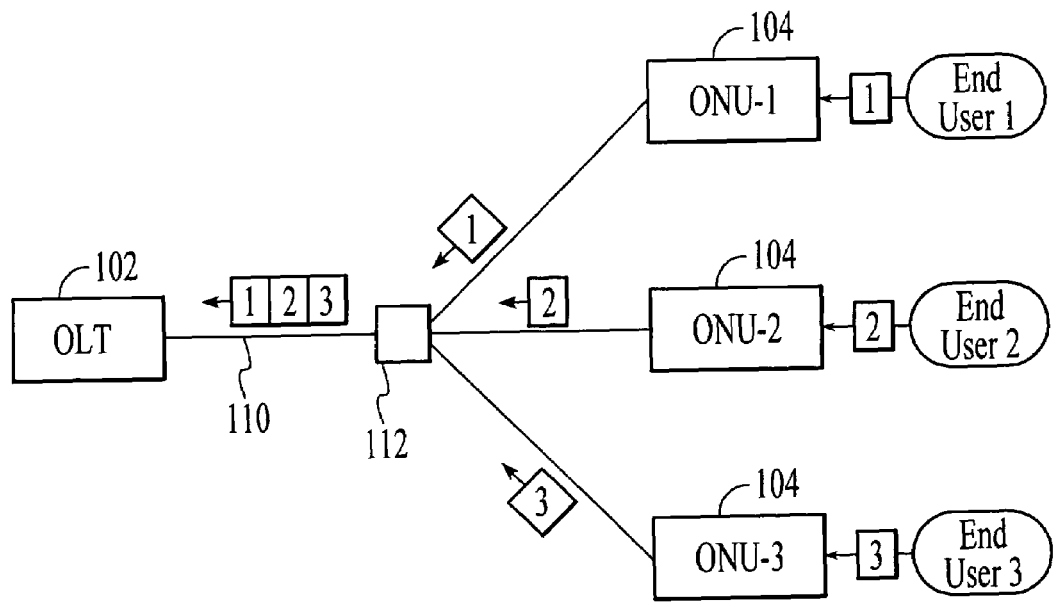
FIG. 1B depicts the upstream flow of traffic from multiple ONUs to an OLT in a point-to-multipoint PON.
Figure 2:
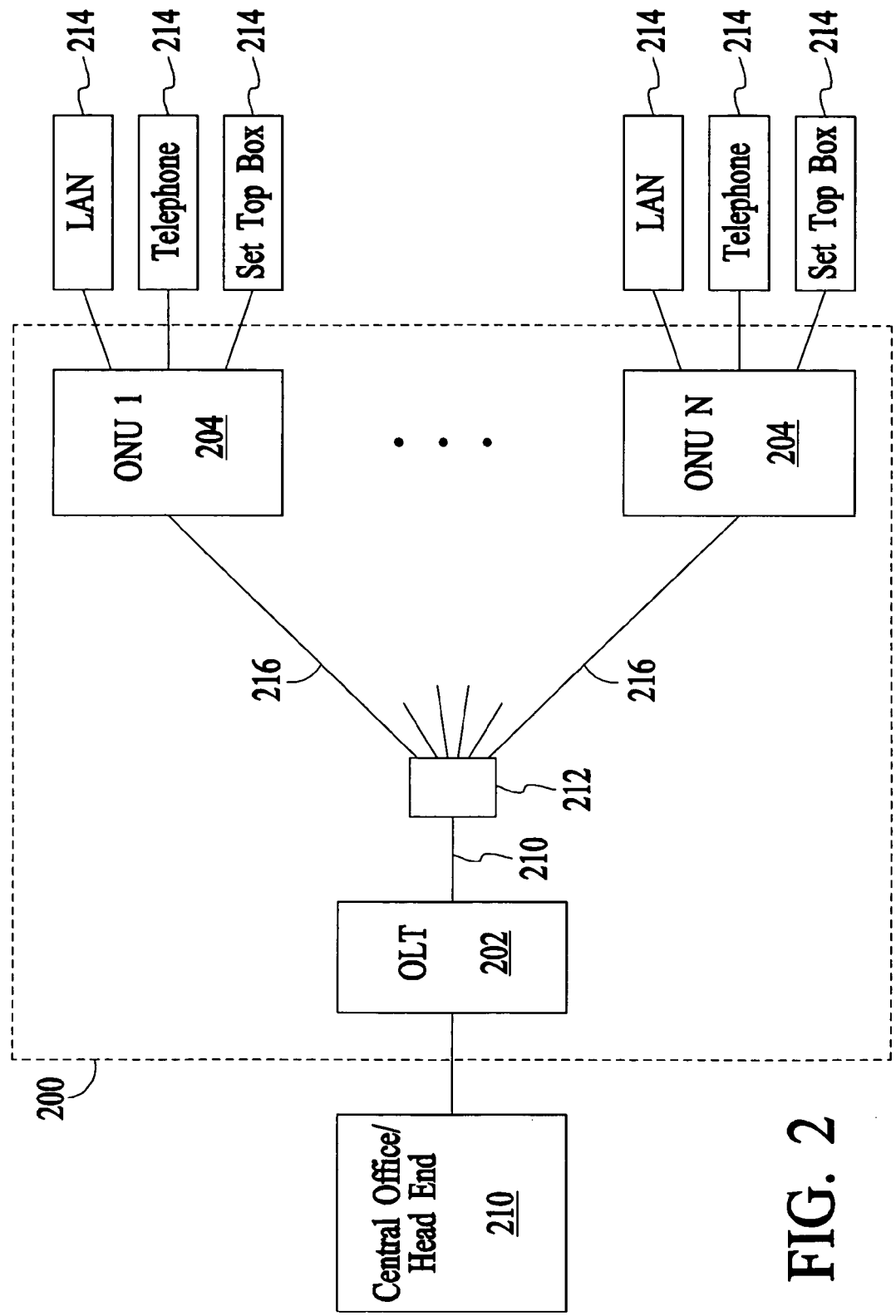
FIG. 2 depicts a point-to-multipoint PON with a tree topology.

FIG. 2 depicts an example point-to-multipoint PON 200. The point-to-multipoint PON includes an OLT 202 and multiple ONUs 204 that are connected by a passive optical distribution network. In an embodiment, the OLT is connected to a service station 210, such as a central office and/or a head-end station. Services provided at the service station may include data network access, voice network access, and/or video network access. Example connection protocols utilized between the service station and the OLT may include OC-x, ethernet, E1/T1, DS3, and broadband video. In an embodiment, the ONUs are connected to an end user system or systems 214, which may include a local area network, personal computers, a PBX, telephones, set-top boxes, and/or televisions. Example connection protocols utilized between the end user systems and the ONUs may include 10/100 Mb/s ethernet, T1, and plain old telephone service (POTS).

The passive optical distribution network shown in FIG. 2 has a tree topology that includes a common optical fiber 210 (trunk fiber) and multiple ONU-specific fibers 216 that are connected by a passive optical splitter/coupler 212. An optical signal transmitted in the downstream direction (from the OLT 202 to the ONUs 204) is optically split into multiple ONU-specific optical signals that all carry the same information. Optical signals transmitted in the upstream direction (from the ONUs to the OLT) are optically coupled into the trunk fiber that is connected between the coupler and the OLT. As explained in more detail below, time division multiplexing is utilized in the upstream direction to prevent collisions of upstream transmissions from two or more ONUs.

In the embodiment of FIG. 2, an optical signal in the downstream direction is transmitted at a different wavelength (or frequency) than an optical signal in the upstream direction. In an embodiment, downstream traffic is transmitted in the 1550 nm wavelength band and upstream traffic is transmitted in the 1310 nm wavelength band. Utilizing different wavelengths in the upstream and downstream directions allows a single optical fiber to simultaneously carry downstream and upstream traffic without interfering collisions. In an alternative embodiment, separate downstream and upstream fibers may be utilized for the passive optical distribution network. In addition, wavelength division multiplexing (WDM) may be used in the downstream and/or upstream directions to increase transmission bandwidth.

Although the passive optical distribution network of FIG. 2 has a tree topology, alternative network topologies are possible. Alternative network topologies include a bus topology and a ring topology. In addition, although the distribution network of FIG. 2 depicts only single fiber connections between network components, redundant fibers may be added between network components to provide fault protection.

Figure 3:
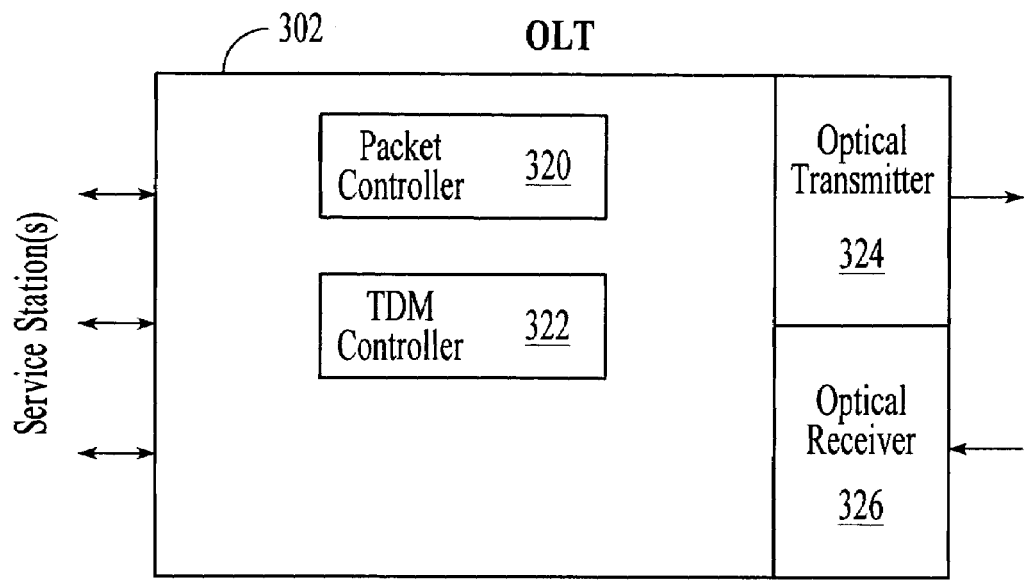
FIG. 3 depicts a functional block diagram of an OLT for transmitting variable-length packets downstream, in accordance with an embodiment of the invention.

FIG. 3 is an expanded view of an example OLT 302 in the point-to-multipoint PON of FIG. 2. Functional units included within the OLT are a packet controller 320, a time division multiplexing (TDM) controller 322, an optical transmitter 324, and an optical receiver 326. The OLT may also include other well known functional units that are not depicted. The packet controller receives downstream digital data from a service station and formats the downstream digital data into variable-length packets. The packet controller may be embodied in hardware and/or software and is sometimes referred to as the media access control (MAC) unit. In an embodiment, each variable-length packet includes a fixed-length header at the front of the packet, a variable-length payload after the header, and a fixed-length error detection field (such as a frame check sequence (FCS) field) at the end of the packet. In an embodiment, the downstream variable-length packets are formatted according to the IEEE 802.3 standard (commonly referred to as ethernet) or any of the related IEEE 802.3x sub-standards. In an embodiment, the downstream variable-length packets are transmitted at a rate of 1 gigabit per second (Gb/s) as defined by IEEE 802.3z (commonly referred to as gigabit ethernet), although lower or higher transmission rates may be utilized.

In an embodiment, much of the downstream digital data arrives at the packet controller 320 in IP datagrams that range in size up to a maximum of 65,535 bytes. The packet controller reads header information from the IP datagrams and generates variable-length packets that include the IP datagrams as the payload. In an embodiment, the length of each variable-length packet is related to the length of the IP datagram that is placed into the payload. That is, if a downstream IP datagram is 100 bytes, then the variable-length packet will include 100 bytes of payload plus the packet overhead (the header and the error detection field) and if the IP datagram is 1,000 bytes then the variable-length packet will include 1,000 bytes of payload plus the packet overhead. In an embodiment in which the packets are formatted according to IEEE 802.3, the maximum length of a packet is 1,518 bytes (1,500 bytes of payload and 18 bytes of packet overhead). If an IP datagram exceeds 1,500 bytes then the IP datagram is broken down into multiple IP datagrams that are carried in multiple variable-length packets. In contrast, an ATM-based point-to-multipoint PON breaks IP datagrams down into 48 byte segments regardless of the size of the original IP datagram and then adds the 5 byte header to create each ATM cell. When network traffic predominantly consists of IP traffic, the use of ATM as the data link protocol in a point-to-multipoint PON significantly increases the amount of bandwidth that is consumed by overhead. Although IP is described as the higher layer protocol, other network protocols, such as IPX and Appletalk, may be carried over the PON.

The TDM controller 322 of the OLT 302 depicted in FIG. 3 controls the downstream flow of traffic from the OLT to the ONUs. Specifically, the TDM controller controls downstream framing and allocates bandwidth to variable-length packets that need to be transmitted downstream. The TDM controller may be embodied in hardware and/or software.

The optical transmitter 324 and the optical receiver 326 provide the interface between optical and electrical signals. Optical transmitters and receivers are well known in the field of point-to-multipoint PONs and are not described in further detail.

Figure 4:
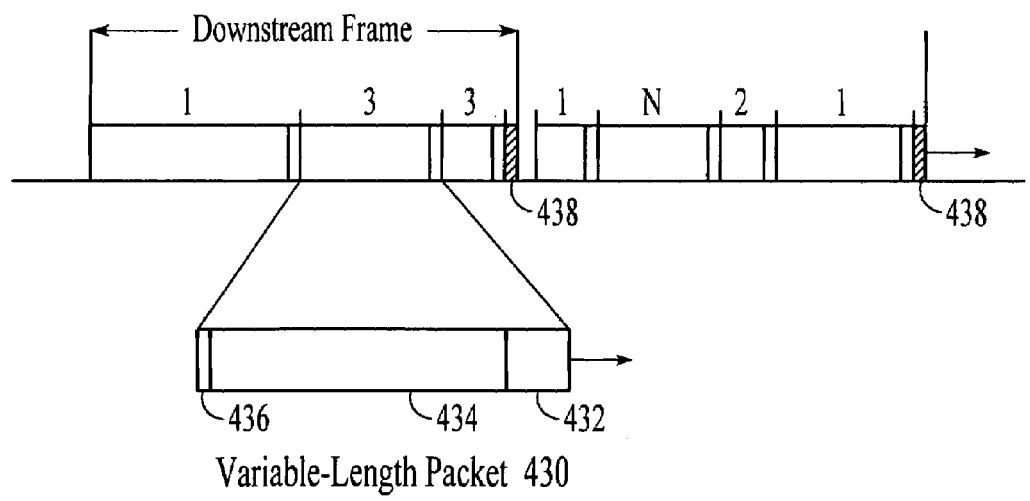
FIG. 4 depicts an example of downstream traffic that is transmitted from an OLT to multiple ONUs utilizing variable-length packets, in accordance with an embodiment of the invention.

FIG. 4 depicts an example of downstream traffic that is transmitted from the OLT to the ONUs in variable-length packets. In the embodiment, the downstream traffic is segmented into downstream frames that are fixed interval segments, which each carry multiple variable-length packets. In an embodiment, clocking information, in the form of a synchronization marker 438, represents the beginning of each downstream frame. In an embodiment, the synchronization marker is a 1 byte code that is transmitted every 2 ms in order to synchronize the ONUs with the OLT.

In the embodiment of FIG. 4, each variable-length packet is intended to be read by a particular ONU, as indicated by the numbers, 1 through N, above each packet. In an embodiment, the variable-length packets are formatted according to the IEEE 802.3 standard and are transmitted downstream at 1 Gb/s. The expanded view of one variable-length packet 430 shows the header 432, the variable-length payload 434, and the error detection field 436 of the packet. Because the packets have variable-length payloads, the size of each packet is related to the size of the payload, for example the IP datagram or datagrams, carried within the payload. Although each variable-length packet in FIG. 4 is intended to be read by a particular ONU (unicast packet), some packets may be intended to be read by all of the ONUs (broadcast packets), or a particular group of ONUs (multicast packets).

FIG. 5 is an expanded view of an example ONU 504 in the point-to-multipoint PON 200 of FIG. 2. Functional units included within the ONU are a packet controller 520, a TDM controller 522, an optical transmitter 524, and an optical receiver 526. The ONUs may also include other well known functional units that are not depicted. The packet controller receives upstream digital data from end user systems and formats the upstream digital data into variable-length packets, with each variable-length packet including a header, a payload, and an error detection field as described above with reference to the downstream traffic. The packet controller is embodied in hardware and/or software and is sometimes referred to as the MAC unit. As with the downstream traffic, in an embodiment, the upstream variable-length packets are formatted according to the IEEE 802.3 standard and transmitted at a rate of 1 Gb/s. In an embodiment, much of the upstream digital data arrives at the packet controller in IP datagrams. In an embodiment, the packet controller reads header information from the upstream IP datagrams and generates variable-length packets that include the IP datagrams as the payload. In an embodiment, the length of each variable-length packet is related to the length of the respective IP datagram. In many implementations, the upstream traffic arrives at the ONUs via an ethernet connection and therefore the traffic does not need to be reformatted into ethernet packets.

The TDM controller 522 of each ONU 504, as depicted in FIG. 5, controls the upstream flow of traffic from each ONU to the OLT. Specifically, the TDM controller for each ONU in conjunction with the OLT ensures that the respective ONU transmits upstream variable-length packets in the designated time slot of a time division multiple access (TDMA) protocol. In order to synchronize transmissions between multiple ONUs, the ONUs utilize timing information from the OLT to maintain synchronized clocks. During operation, each ONU is allocated ONU-specific time slots by the OLT that are established so that upstream transmissions from the multiple ONUs do not collide with each other after they are combined into the trunk fiber. That is, the ONU-specific time slots do not overlap in time on the trunk fiber. It should be noted that prior art ethernet networks utilize CSMA/CD as the media access control protocol to ensure that all transmissions over a shared media reach their ultimate destination without collisions. CSMA/CD limits the maximum separation distance between the ONUs and therefore limits the viability of an ethernet with CSMA/CD based point-to-multipoint PON as a local access network architecture. Utilizing time division multiplexing as a media access control protocol, the separation distance between the ONUs is not limited by the CSMA/CD collision domain. The TDM controller is embodied in hardware and/or software.

FIG. 6 depicts an example of upstream traffic that is time division multiplexed into the common optical fiber 210 shown in FIG. 2 in order to avoid collisions between upstream traffic from the ONUs 204. In the embodiment of FIG. 6, the upstream traffic is segmented into upstream frames and each upstream frame is further segmented into ONU-specific time slots. In an embodiment, the upstream frames are formed by a continuous transmission interval of, for example, 2 ms. In an embodiment, the start of each upstream frame is identified by a frame header (not shown).

The ONU-specific time slots are transmission intervals within each upstream frame that are dedicated to the transmission of variable-length packets from specific ONUs. In an embodiment, each ONU has a dedicated ONU-specific time slot within each upstream frame. For example, referring to FIG. 6, each upstream frame is divided into N time slots, with each time slot being related to the respective 1 through N ONUs. In an embodiment that includes 2 ms upstream frames and 32 ONUs that have equal bandwidth allocations, each time slot represents less than approximately 62.5 µs of transmission time. At an upstream transmission rate of 1 Gb/s each time slot can carry approximately 7,800 bytes.

The TDM controller for each ONU, in conjunction with timing information from the OLT, controls the upstream transmission timing of the variable-length packets within the dedicated time slots. FIG. 6 depicts an expanded view of an ONU-specific time slot (dedicated to ONU-4) that includes two variable-length packets 640 and 642 and some time slot overhead 644. In an embodiment, the time slot overhead includes a guard band, timing indicators, and signal power indicators. Although FIG. 6 only depicts two variable-length packets within the ONU-specific time slot, more variable-length packets may be transmitted within each time slot. Likewise, a time slot may be filled with an idle signal if there is no traffic to transmit from the ONU.

Because the time slots are filled with variable-length packets, the allotted time slots usually cannot be entirely filled with complete variable-length packets. That is, if the current time slot cannot accommodate all of the awaiting packets, then the excess packets must be transmitted in a subsequent time slot. Even though the excess packets are transmitted in the subsequent time slot, the end portion of the current time slot is usually filled with a fragment of one of the awaiting frames. Although the frame fragment is transmitted in the end portion of the current time slot, the packet is recognized as incomplete by the receiver, is discarded, and must be completely retransmitted in the subsequent time slot. Because the variable-length packets will almost never entirely fill a time slot with complete packets, part of the transmission capacity of each time slot is wasted in fully loaded traffic conditions. For example, the expanded view of the ONU-specific time slot in FIG. 6 shows a portion 646 of the time slot that is not utilized for transmission of a complete variable-length packet. A protocol for utilizing the remaining portions of the time slots is described below with reference to FIGS. 7–10.

FIG. 6 also depicts an expanded view of variable-length packet 642 within the ONU-specific time slot. The expanded view of the variable-length packet 642 shows the header 632, the variable-length payload 634, and the error detection field 636. In the embodiment of FIG. 6, the payload of the variable-length packet is an IP datagram and the length of the variable-length packet is related to the length of the IP datagram.

Figure 7:
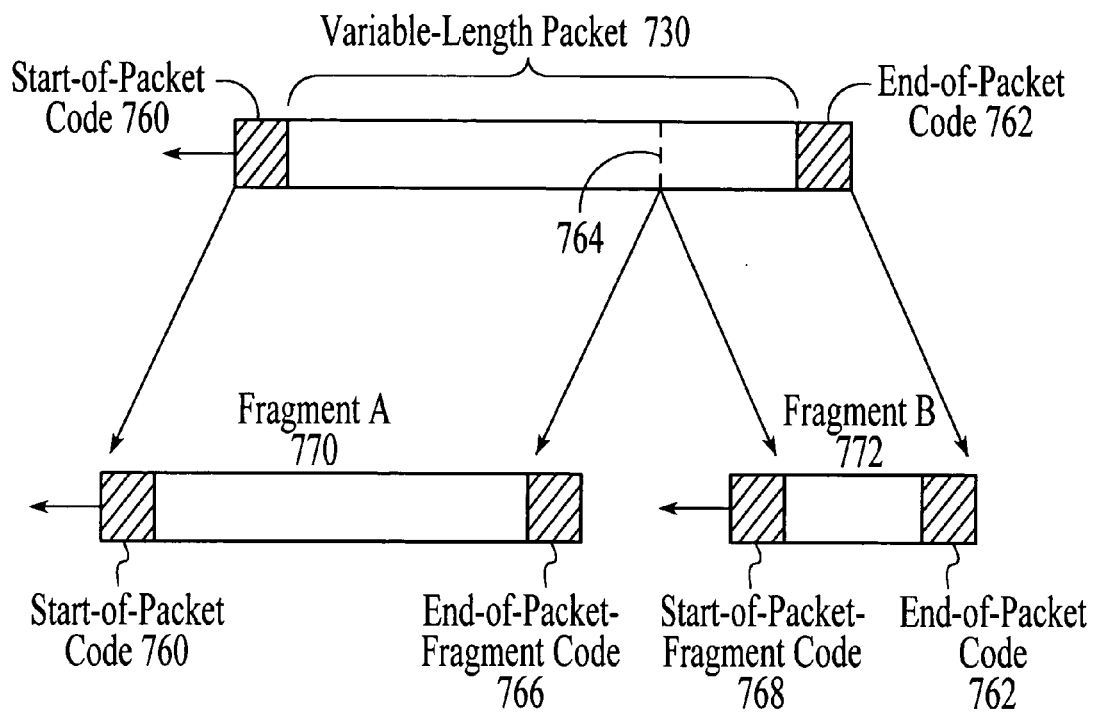
FIG. 7 depicts a variable-length packet that is split into two packet fragments, with the first packet fragment including an "end-of-packet-fragment" code and the second packet fragment including a "start-of-packet-fragment" code in accordance with an embodiment of the invention.

A protocol for utilizing the remaining portions of time slots to transmit upstream traffic is described with reference to FIGS. 7–10. Referring to FIG. 7, as is well known in the field of packet-switched networks, each variable-length packet 730 is encapsulated with start-of-packet and end-of-packet codes 760 and 762 which identify, at the physical layer, the start and end of each packet. As described above, in an embodiment, each variable-length packet includes a packet header, a variable-length payload, and an error detection field although these are not individually shown in FIG. 7. For example purposes, it is assumed that the variable-length packet in FIG. 7 is the last packet in a current time slot and it is also assumed that the variable-length packet exceeds the available transmission time in the remaining portion of the current time slot. In the example of FIG. 7, the portion of the packet that fits into the current time slot is to the left of dashed line 764 and the portion of the packet that does not fit into the current time slot is to the right of dashed line 764.

In order to fully utilize the available transmission time in each time slot, the variable-length packet 730 is broken into two fragments at the dashed line 764 as shown in FIG. 7. The front portion of the fragmented packet (fragment A 770) has an "end-of-packet-fragment" code 766 added to the end of the packet fragment in addition to the start-of-packet code 760 that is at the beginning of the packet. The end-of-packet-fragment code is a unique code that identifies that the transmitted data unit is only a fragment of a variable-length packet. When the receiving unit, for example an OLT, identifies the end-of-packet-fragment code, the OLT recognizes the data unit as a packet fragment and stores the packet fragment in a packet fragment buffer. The packet fragment is stored in the fragment buffer until the related packet fragment is received.

The related packet fragment (fragment B 772) has a "start-of-packet-fragment" code 768 added to the beginning of the packet fragment in addition to the end-of-packet code 762 that is at the end of the packet. The start-of-packet-fragment code is a unique code that identifies the transmitted unit as a fragment of a packet. In an embodiment, when the transmitting unit, for example an ONU, splits a packet into two fragments, the second fragment is temporarily stored at the ONU in a packet fragment buffer until the next ONU-specific time slot is available.

Figure 8:
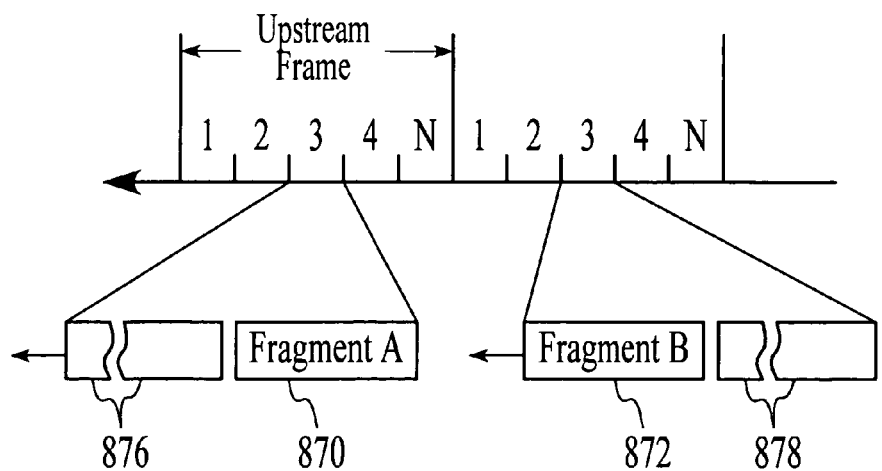
FIG. 8 depicts the packet fragments of FIG. 7 being transmitted in successive ONU-specific time slots in accordance with an embodiment of the invention.

FIG. 8 depicts an example of how the variable-length packet 730, described with reference to FIG. 7, is transmitted over two ONU-specific time slots in order to better utilize the available bandwidth of each time slot. As shown and described above in FIG. 6, the upstream traffic is divided into upstream frames and the upstream frames are further divided into ONU-specific time slots. In the example of FIG. 8, it is assumed that packet fragments A and B 870 and 872 are generated at ONU-3 and transmitted in the ONU-specific time slots allotted to ONU-3. In an embodiment, fragment A is transmitted at the end of one ONU-specific time slot and fragment B is transmitted at the beginning of the next ONU-specific time slot. Although fragment B is transmitted at the beginning of the next ONU-specific time slot, in alternative embodiments, fragment B may be transmitted in a later ONU-specific time slot or in a different location within a time slot. As indicated in FIG. 8, the ONU-specific time slot that includes fragment A includes other variable-length packets 876 that are, for example, transmitted before fragment A. Likewise, the ONU-specific time slot that includes fragment B includes other variable-length packets 878 that are, for example, transmitted after fragment B.

Figure 9:
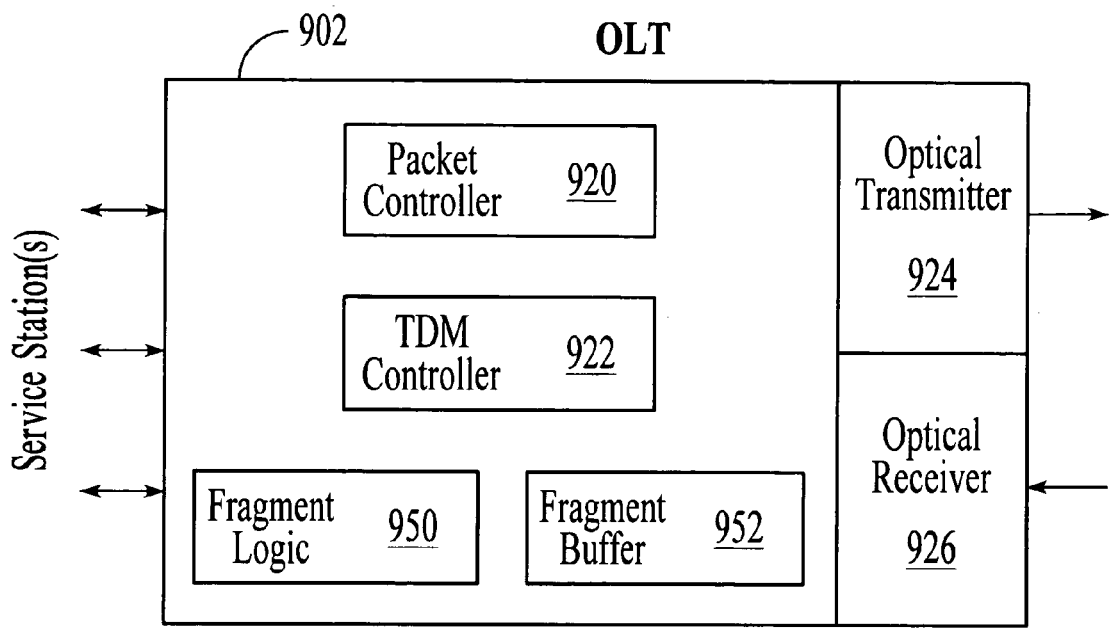
FIG. 9 depicts an OLT that includes fragment logic and a fragment buffer in accordance with an embodiment of the invention.

FIG. 9 depicts an OLT that includes fragment logic 950 and a fragment buffer 952 for implementing the above-described protocol. The fragment logic recognizes the unique start-of-packet-fragment and end-of-packet-fragment codes, controls the buffering of packet fragments, and recombines the packet fragments after they are received at the OLT. The fragment buffer at the OLT stores the first transmitted packet fragment (e.g. fragment A) until the second transmitted fragment (e.g. fragment B) arrives at the OLT.

Figure 10:
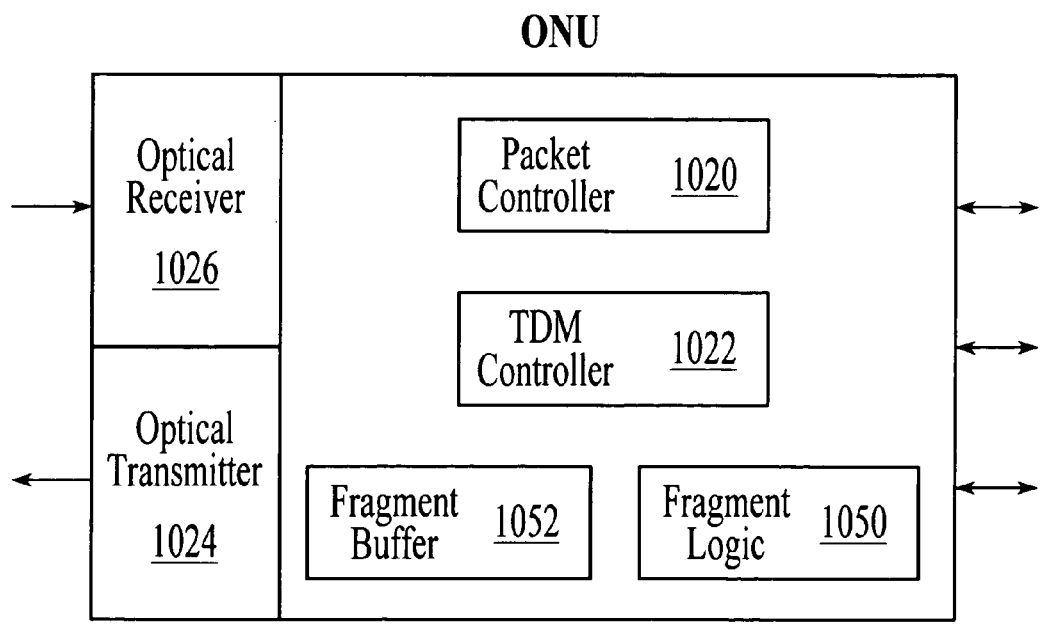
FIG. 10 depicts an ONU that includes fragment logic and a fragment buffer in accordance with an embodiment of the invention.

FIG. 10 depicts an ONU that includes fragment logic 1050 and a fragment buffer 1052 for implementing the above-described protocol. The fragment logic splits the appropriate packets into packet fragments, adds the start-of-packet-fragment and end-of-packet-fragment codes, and controls the buffering of packet fragments. The fragment buffer at the ONU stores the second packet fragment (e.g. fragment B) until an ONU-specific time slot is available. When an ONU-specific time slot becomes available, the buffered packet fragment is transmitted.

In operation, as the current ONU-specific time slot is being filled, it is recognized that the last packet does not completely fit into the remaining portion of the time slot. The last variable-length packet is fragmented into two parts (fragment A and fragment B) and an end-of-packet-fragment code is added to fragment A and a start-of-packet-fragment code is added to the beginning of fragment B. Fragment A is transmitted in the current ONU-specific time slot and fragment B is stored at the ONU in the fragment buffer. When fragment A is received at the OLT, the OLT recognizes the end-of-packet-fragment code and stores fragment A in the OLT fragment buffer. The ONU transmits fragment B in a next available time slot and when fragment B is received at the OLT, it is recognized as a packet fragment by its start-of-packet-fragment code. Fragments A and B are then combined by the OLT into the original variable-length packet.

Figure 11:
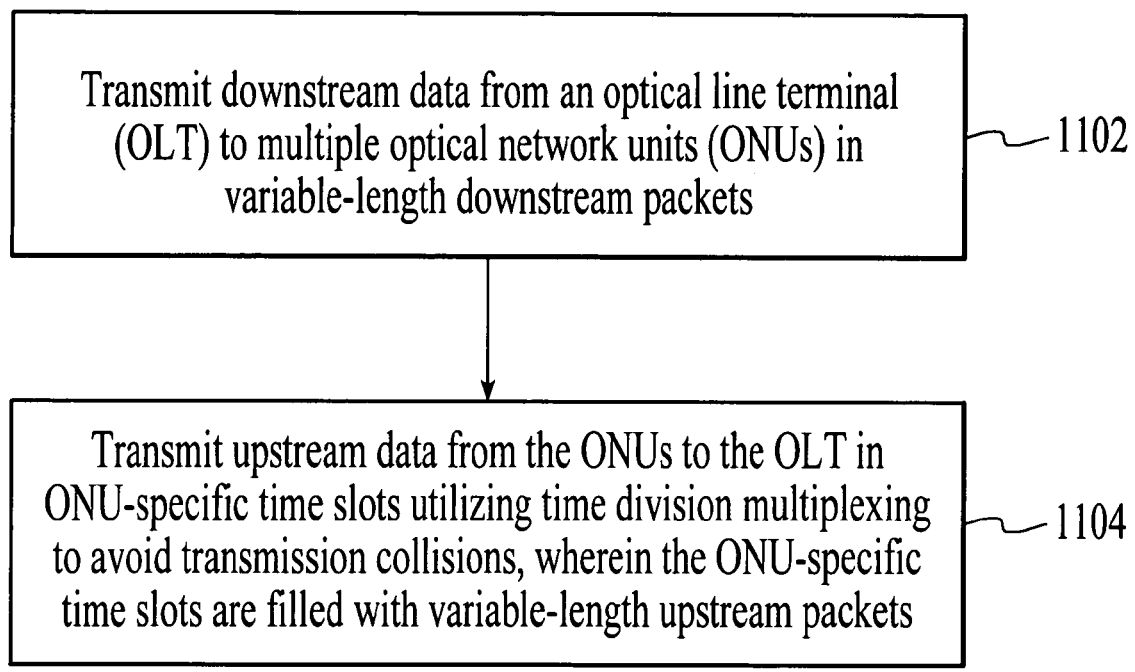
FIG. 11 is a process flow diagram of a method for exchanging information between the OLT and multiple ONUs in accordance with an embodiment of the invention.

A method for exchanging information between an OLT and multiple ONUs in a point-to-multipoint PON is depicted in the process flow diagram of FIG. 11. In a step 1102, downstream data is transmitted from the OLT to the ONUs in variable-length downstream packets. In a step 1104, upstream data is transmitted from the ONUs to the OLT in ONU-specific time slots utilizing time division multiplexing to avoid transmission collisions, wherein the ONU-specific time slots are filled with variable-length upstream packets.

What is claimed is:

1. A point-to-multipoint optical communications system comprising:
   an optical line terminal (OLT); and
   a plurality of optical network units (ONUs) connected to said OLT by a passive optical network in which downstream data is transmitted from said OLT to said ONUs over said passive optical network and upstream data is transmitted from said ONUs to said OLT over said passive optical network:
   said OLT transmitting downstream data over said passive optical network in variable-length downstream packets;
   said ONUs transmitting downstream data over said passive optical network within ONU-specific time slots utilizing time division multiplexing, wherein said ONU-specific time slots are filled with multiple variable-length upstream packets;
   said OLT includes:
      a fragment buffer for storing packet fragments that have been transmitted upstream from said ONUs; and
      fragment logic for:
         identifying said end-of-packet-fragment code of said first packet fragment;
         buffering said first packed fragment in said OLT fragment buffer;
         identifying said start-of-packet-fragment code of said first packet fragment;
         reconstructing said variable-length upstream packet from said first and second packet fragments;
   said ONUs include:
      fragment buffers for storing packet fragments that are to be transmitted upstream from said ONUs; and
      fragment logic for:
         splitting a variable-length upstream packet into first and second packet fragments; and
         adding an end-of-packet-fragment code to said first packet fragment and adding a start-of-packet-fragment code to said second packet fragment.

2. The system of claim 1 wherein said variable-length downstream packets are formatted according to IEEE 802.3.

3. The system of claim 1 wherein said variable-length downstream packets include Internet protocol (IP) datagrams.

4. The system of claim 3 wherein the lengths of said variable-length downstream packets include the lengths of said IP datagrams plus packet overhead.

5. The system of claim 1 wherein said variable-length upstream packets include Internet protocol (IP) datagrams.

6. The system of claim 5 wherein the lengths of said variable-length upstream packets include the lengths of said IP datagrams plus packet overhead.

7. The system of claim 1 wherein:
   said variable-length downstream packets and said variable-length upstream packets are formatted according to IEEE 802.3; and
   said downstream data and said upstream data include Internet protocol (IP) datagrams.

8. A method for exchanging information between an optical line terminal (OLT) and mutliple optical network units (ONUs) in a point-to-multipoint passive optical network comprising:
   transmitting downstream data from said OLT to said ONUs in variable-length downstream packets;
   transmitting upstream data from said ONUs to said OLT in ONU-specific time slots utilizing time division multiplexing to avoid transmission collisions, wherein said ONU-specific time slots are filled with multiple variable-length upstream packets;
   splitting a variable-length upstream packet into a first packet fragment and a second packet fragment;
   adding an end-of-packet-fragment code to the end of said first packet fragment;
   adding a start-of-packet-fragment code to the start of said second packet fragment;
   transmitting said first packet fragment upstream in a first ONU-specific time slot;
   buffering said second packet fragment for transmission in a second ONU-specific time slot that is different from said first ONU-specific time slot;
   buffering said first packet fragment after said first packet fragment is received at said OLT; and
   reconstructing said variable-length upstream packet, at said OLT, from said first packet fragment and said second packet fragment.

9. The system of claim 8 wherein said variable-length downstream and upstream packets are formatted in accordance with IEEE 802.3 protocol.

10. The method of claim 8 wherein said variable-length downstream and upstream packets include overhead and a payload, and wherein the length of each of said variable-length packets includes the length of an Internet protocol (IP) datagram that is included in the payload of each of said variable-length packets plus the packet overhead.

11. A point-to-multipoint optical communications systems comprising:
    an optical line terminal (OLT); and
    a plurality of optical network units (ONUs) connected to said OLT by a passive optical network in which downstream data is transmitted from said OLT to said ONUs and upstream data is transmitted from said ONUs to said OLT;
    said OLT including means for formatting downstream datagrams into variable-length downstream packets;
    each of said ONUs including:
       means for formatting upstream datagrams into variable-length upstream packets: and
       means for timing the transmission of said variable-length upstream packets to coincide with ONU-specific time slots in order to avoid collisions with upstream packets from other ONUs, wherein said ONU-specific time slots are filled with multiple variable-length upstream packets;
    said OLT includes:
       a fragment buffer for storing packet fragments that have been transmitted upstream from said ONUs;
       fragment logic for:
          identifying said end-of-packet fragment code of said first packet fragment;
          buffering said first packet fragment in said OLT fragment buffer;
          identifying said start-of-packet-fragment code of said second packet fragment; and
          reconstructing said variable-length upstream packet from said first and second packet fragments;
    said ONUs include:
       fragment buffers for storing packet fragments that are to be transmitted upstream from said ONUs;
       fragment logic for:
          splitting a variable-length upstream packet into first and second packet fragments; and adding an end-of-packet-fragment code to said first packet fragment and adding a start-of-packet-fragment code to said second packet fragment.

12. The system of claim 11 wherein said variable-length downstream packets are formatted according to IEEE 802.3.

13. The system of claim 11 wherein said downstream datagrams are Internet protocol (IP) datagrams.

14. The system of claim 13 wherein the length of said variable-length downstream packets include the lengths of said IP datagrams plus packet overhead.

15. The system of claim 11 wherein said upstream datagrams are Internet protocol (IP) datagrams.

16. The system of claim 15 wherein the lengths of said variable-length upstream packets include the lengths of said IP datagrams plus packet overhead.

17. The system of claim 11 wherein:
said variable-length downstream packets and said variable-length upstream packets are formatted according to IEEE 802.3; and
said downstream datagrams and said upstream datagrams are Internet protocol (IP) datagrams.

18. A point-to-multipoint optical communications system comprising:
an optical line terminal (OLT); and
a plurality of optical network units (ONUs) connected to said OLT by a passive optical network in which downstream data is transmitted from said OLT to said ONUs over said passive optical network and upstream data is transmitted from said ONUs to said OLT over said passive optical network;
said OLT transmitting downstream data over said passive optical network in variable-length downstream packets;
said ONUs transmitting upstream data over said passive optical network within ONU-specific time slots utilizing time division multiplexing, wherein said ONU-specific time slots are filled with multiple variable-length upstream packets;
said OLT including a fragment buffer for storing packet fragments that have been transmitted upstream from said ONUs;
said ONUs including;
fragment buffers for storing packet fragments that are to be transmitted upstream from said ONUs;
fragment logic for splitting a variable-length upstream packet into first and second packet fragments, adding an end-of-packet-fragment code to said first packet fragment, and adding a start-of-packet-fragment code to said second packet fragment;
said OLT includes fragment logic for:
identifying said end-of-packet-fragment code of said first packet fragment;
buffering said first packet fragment in said OLT fragment buffer;
identifying said start-of-packet-fragment code of said second packet fragment; and
reconstructing said variable-length upstream packet from said first and second packet fragments.

19. The system of claim 18 wherein said variable-length downstream packets are formatted according to IEEE 802.3.

20. The system of claim 18 wherein said variable-length downstream packets included Internet protocol (IP) datagrams.

21. The system of claim 20 wherein the lengths of said variable-length downstream packets include the lengths of said IP datagrams plus packet overhead.

22. The system of claim 18 wherein said variable-length upstream packets are formatted according to IEEE 802.3.

23. The system of claim 18 wherein said variable-length upstream packets include Internet protocol (IP) datagrams.

24. The system of claim 23 wherein the lengths of said variable-length upstream packets include the lengths of said IP datagrams plus packet overhead.

25. The system of claim 18 wherein;
said variable-length downstream packets and said variable-length upstream packets are formatted according to IEEE 802.3; and
said downstream data and said upstream data include Internet protocol (IP) datagrams.

26. A method of exchanging information between an optical line terminal (OLT) and multiple optical network units (ON Us) in a point-to-multipoint passive optical network comprising:
transmitting downstream data from said OLT to said ONUs in variable-length downstream packets;
transmitting downstream synchronization markers at constant time intervals;
transmitting upstream data from said ONUs to said OLT in ONU-specific time slots utilizing time division multiplexing to avoid transmission collisions, wherein said ONU-specific time slots are filled with variable-length upstream packets;
splitting a variable-length upstream packet into a first packet fragment and a second packet fragment;
adding an end-of-packet-fragment code to the end of said first packet fragment:
adding a start-of-packet-fragment code to the start of said second packet fragment;
transmitting said first packet fragment upstream in a first ONU-specific to time slot;
buffering said second packet fragment for transmission in a second ONU-specific time slot that is different from said first ONU-specific time slot;
buffering said first packet fragment after said first packet fragment is received at said OLT; and
reconstructing said variable-length upstream packet, at said OLT, from said first packet fragment and said second packet fragment.

27. The method of claim 26 wherein said variable-length downstream and upstream packets are formatted in accordance with the IEEE 802.3 protocol.

28. The method of claim 26 wherein said variable-length downstream and upstream packets include packet overhead and a payload, and wherein the length of each of said variable-length packets includes the length of an Internet protocol (IP) datagram that is included in the payload of each of said variable-length packets plus the packet overhead.

29. The method of claim 26 wherein said ONU-specific time slots are filled with multiple variable-length packets according to IEEE 802.3 format.

30. A method for exchanging information between an optical line terminal (OLT) and multiple optical network units (ONUs) in a point-to-multipoint passive optical network comprising:
transmitting downstream data from said OLT to said ONUs in variable-length downstream packets;
transmitting upstream data from said ONUs to said OLT in ONU-specific time slots utilizing time division multiplexing to avoid transmission collisions, wherein said ONU-specific time slots are filled with variable-length upstream packets;
splitting a variable-length upstream packet into a first packet fragment and a second packet fragment;

adding an end-of-packet-fragment code to the end of said first packet fragment;
adding a start-of-packet-fragment code to the start of said second packet fragment;
transmitting said first packet fragment upstream in a first ONU-specific time slot;
buffering said second packet fragment for transmission in a second ONU specific time slot that is different from said first ONU-specific time slot;
buffering said first packet fragment after said first packet fragment is received at said OLT; and
reconstructing said variable-length upstream packet, at said OLT from said first packet fragment and said second packet fragment.

31. The method of claim 30 wherein said variable-length downstream and upstream packets are formatted in accordance with the IEEE 802.3 protocol.

32. The method of claim 30 wherein said variable-length downstream and upstream packets include packet overhead and a payload, and wherein the length of each of said variable-length packets includes the length of an Internet protocol (IP) datagram that is included in the payload of each of said variable-length packets plus the packet overhead.

33. A point-to-multipoint optical communications system comprising:
an optical line terminal (OLT); and
a plurality of optical network units (ONUs) connected to said OLT by a passive optical network in which downstream data is transmitted from said OLT to said ONUs and upstream data is transmitted from said ONUs to said OLT;
said OLT including means for formatting downstream datagrams into variable-length downstream packets and a fragment buffer for storing packet fragments that have been transmitted upstream from said ONUs;
each of said ONUs including:
means for formatting upstream datagrams into variable-length upstream packets;
means for timing the transmission of said variable-length upstream packets to coincide with the ONU-specific time slots in order to avoid collisions with upstream packets from other ONUs;
fragment buffers for storing packet fragments that are to be transmitted upstream from said ONUs; and
fragment logic for:
splitting a variable-length upstream packet into first and second packet fragments; and
adding an end-of-packet fragment code to said first packet fragment and adding a start-of-packet-fragment code to said second packet fragment;
said OLT including fragment logic for:
identifying said end-of-packet-fragment code of said first packet fragment;
buffering said first packet fragment In said OLT fragment buffer;
identifying said start-of-packet-fragment code of said second packet fragment; and
reconstructing said variable-length upstream packet from said first and second packet fragments.

34. The system of claim 33 wherein said variable-length downstream packets are formatted according to IEEE 802.3.

35. The system of claim 33 wherein said downstream datagrams are Internet protocol (IP) datagrams.

36. The system of claim 35 wherein the lengths of said variable-length downstream packets include the lengths of said IP datagrams plus packet overhead.

37. The system of claim 33 wherein said variable-length upstream packets are formatted according to IEEE 802.3.

38. The system of claim 33 wherein said upstream datagrams are Internet protocol (IP) datagrams.

39. The system of claim 38 wherein the lengths of said variable-length upstream packets include the lengths of said IP datagrams plus packet overhead.

40. The system of claim 33 wherein:
said variable-length downstream packets and said variable-length upstream packets are formatted according to IEEE 802.3; and
said downstream datagrams and said upstream datagrams are Internet protocol (IP) datagrams.

41. A point-to-multipoint optical communications system comprising and optical line terminal (OLT); and
a plurality of optical network units (ONUs) connected to said OLT by a passive optical network in which downstream data is transmitted from said OLT to said ONUs over said passive optical network and upstream data is transmitted from said ONUs to said OLT over said passive optical network;
said OLT transmitting downstream data over said passive optical network in variable-length downstream packets and downstream synchronization markers at constant time intervals;
said ONUs transmitting upstream data over said passive optical network within ONU-specific time slots utilizing time division multiplexing, wherein said ONU-specific time slots are filled with multiple variable-length upstream packets,
said OLT includes:
a fragment buffer for storing packet fragments that have been transmitted upstream from said ONUs;
fragment logic for:
identifying said end-of-packet fragment code of said first packet fragment;
buffering said first packet fragment in said OLT fragment buffer;
identifying said start-of-packet-fragment code of said second packet fragment;
reconstructing said variable-length upstream packet from said first and second packet fragments;
said ONUs include:
fragment buffers for storing packet fragments that are to be transmitted upstream from said ONUs;
fragment logic for:
splitting a variable-length upstream packet into first and second packet fragments; and
adding an end-of-packet-fragment code to said first packet fragment and adding a start-of-packet fragment code to said second packet fragment.

42. The system of claim 41 wherein said variable-length downstream packets are formatted according to IEEE 802.3.

43. The system of claim 41 wherein said variable-length downstream packets include Internet protocol (IP) datagrams.

44. The system of claim 43 wherein the lengths of said variable length downstream packets includes the lengths of said IP datagrams plus packet overhead.

45. The system of claim 41 wherein said variable-length upstream packets include Internet protocol (IP) datagrams.

46. The system of claim 45 wherein the lengths of said variable-length upstream packets include the lengths of said IP datagrams plus packet overhead.

47. The system of claim 41 wherein;
said variable-length downstream packets and said variable-length upstream packets are formatted according to IEEE 802.3; and
said downstream data and said upstream data include Internet protocol (IP) datagrams.

* * * * *

UNITED STATES PATENT AND TRADEMARK OFFICE
CERTIFICATE OF CORRECTION

| | | |
|---|---|---|
| PATENT NO. | : 7,031,343 B1 | Page 1 of 1 |
| APPLICATION NO. | : 09/715275 | |
| DATED | : April 18, 2006 | |
| INVENTOR(S) | : Jerchan Kuo et al. | |

It is certified that error appears in the above-identified patent and that said Letters Patent is hereby corrected as shown below:

Column 11
    Line 13: please change "downstream" to --upstream--
    Line 24: please change "packed" to --packet--
    Line 61: please change "mutliple" to --multiple--

Column 16
    Line 22: please change "comprising and optical line terminal" to --comprising: an optical line terminal--

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,031,343 B1 | Page 1 of 1 |
| APPLICATION NO. | : 09/715275 | |
| DATED | : April 18, 2006 | |
| INVENTOR(S) | : Jerchen Kuo et al. | |

It is certified that error appears in the above-identified patent and that said Letters Patent is hereby corrected as shown below:

Column 11

Line 27: please change "first" to --second--

Signed and Sealed this

Tenth Day of June, 2008

JON W. DUDAS
*Director of the United States Patent and Trademark Office*